US005774066A

United States Patent [19]

Pellaton et al.

[11] Patent Number: 5,774,066

[45] Date of Patent: Jun. 30, 1998

[54] PROGRAMMABLY OPERABLE SYSTEM FOR THE DELAYED LOCKING/UNLOCKING OF A SECURITY INSTALLATION

[75] Inventors: Pierre Pellaton, Le Locle; Michel Richner, Neuchâtel, both of Switzerland

[73] Assignee: Relhor S.A., La Chaux-de-Fonds, Switzerland

[21] Appl. No.: 639,227

[22] Filed: Apr. 26, 1996

[30] Foreign Application Priority Data

Apr. 28, 1995 [CH] Switzerland ............................ 1231/95

[51] Int. Cl.[6] ........................................ G06F 7/00

[52] U.S. Cl. .............................. 340/825.22; 340/825.31; 70/278; 70/268; 70/272; 70/263; 361/172

[58] Field of Search ......................... 340/825.22, 825.31, 340/825.3, 825.69, 825.72; 70/277, 278, 283, 267, 268, 272, 262, 263, DIG. 45, 271; 361/172; 109/1 R

[56] References Cited

U.S. PATENT DOCUMENTS

| | | | |
|---|---|---|---|
| 4,644,484 | 2/1987 | Flynn et al. | 364/569 |
| 4,916,443 | 4/1990 | Barrett et al. | 70/271 X |
| 4,988,987 | 1/1991 | Barrett et al. | 70/271 X |
| 5,196,841 | 3/1993 | Harder et al. | 340/825.31 |
| 5,387,903 | 2/1995 | Cutter et al. | 340/825.31 |
| 5,591,950 | 1/1997 | Imedio-Ocana | 340/825.31 X |
| 5,594,430 | 1/1997 | Cutter et al. | 340/825.31 |

FOREIGN PATENT DOCUMENTS

| | | |
|---|---|---|
| 0 402 537 | 12/1990 | European Pat. Off. . |
| 0 482 162 | 9/1994 | European Pat. Off. . |
| WO 85/01980 | 5/1985 | WIPO . |
| WO 93/22880 | 11/1993 | WIPO . |

*Primary Examiner*—Brian Zimmerman
*Assistant Examiner*—William H. Wilson, Jr.
*Attorney, Agent, or Firm*—Griffin, Butler, Whisenhunt & Szipl

[57] ABSTRACT

A programmable activation system for the timed locking/unlocking of a security installation includes at least one activation module (10*a*, 10*b*) for unlocking an opening element (4) and apparatus for controlling the module to program a time value corresponding to the precise moment where the activation module (10*a*, 10*b*) will cause the unlocking of the opening element. The control apparatus includes at least one remote control element (30) constituting a mobile detachable or detached part from the activation module (10*a*, 10*b*) which constitutes a fixed part of the installation, these parts including communicating interfaces for the transmission of information, one of the two parts, mobile or fixed, including at least its own exclusive and unique identification code (IDC, IDD), which is transmitted to the other part and memories therein by memories (54, 56) arranged for systematically supplying a traceability of the programming in association with the identification code.

10 Claims, 5 Drawing Sheets

PROGRAMMABLY OPERABLE SYSTEM FOR THE DELAYED LOCKING/ UNLOCKING OF A SECURITY INSTALLATION

FIELD OF THE INVENTION

The present invention concerns a programmably operable system enabling the timed locking/unlocking of a security system, such as a door of a safe, strong box or other element for closing a security chamber requiring an optimal protection of its contents.

BACKGROUND OF THE INVENTION

Security installations such as those of the above-mentioned type are used in different sizes and to different scales in all sites, for example, banks, state organisations or businesses, which have as one of their missions to keep and to protect valuable objects or confidential documents for which an optimal security with respect to the risks of breaking in must be assured.

It is known from experience that in this type of installation the most sensitive point is obviously constituted by the opening door for which has been proposed and supplied many solutions intended to create an obstacle to the most powerful tools and to the ingeniosity of individuals wishing to fraudulently penetrate into the protected security chamber.

More particularly, the quality of materials and the resistance of the closing pieces constituting the mechanical connection between the door and the fixed wall of the chamber have been considerably improved.

The closing systems which equip these doors generally include a system of connecting rods having a high mechanical resistance, which is immovably attached to the door and which is intended to ensure this mechanical connection.

This system of connecting rods may be driven and blocked by a locking bar which can slide in an appropriate passage provided at the interior of the door.

This system of connecting rods may normally be controlled by a first lock system whose opening may be ensured, for example, by a key or, in most sophisticated electronic and electromechanical versions, by an access code, an electronic card or other identification means.

To double the security of these locks, the protected door is generally associated with a locking/unlocking device, which, when it is locked, prevents, during a predetermined period, all sliding movement of the locking bar of the system of connecting rods, thanks to the interposition of a bolt.

This locking/unlocking device is manually armed by means of a key, the unlocking of this device being effectuated automatically, after a programmed timed activation, liberated by a mechanical or electromechanical time base. This type of additional lock is generally known as a time lock.

Thus, during this locking period, no user or operator, even if they are provided with a key, a code or an electronic card intended to open the first lock, is able to be authorised to open the door whose opening is doubly locked.

An arrangement of this type is described in the patent EP 0 482 162.

This arrangement includes notably an electronic time lock which may be programmed to control the freeing of the locking bar of the locking/unlocking device and to thus enable at a particular time or at the completion of a predetermined time lapse, the unlocking of the locking bar to authorise the subsequent opening of the security door, via its system of connecting rods, thanks to the use of the key, access code or identification card which the security personnel possess.

Thus, in this known arrangement, after having locked the locking/unlocking device, notably by means of an arming key, the security personnel program the operation of the time lock so that, at a given time, the time lock unlocks the locking bar which in turn unlocks the bolt and authorises access to the protected site, after opening of the first lock.

Now, there exists a non negligible risk that infractions will be committed due in particular to the collaboration of the security personnel or of other persons, this being by programming the intentional operation of the locking/unlocking device ahead of time.

In fact, the operator which is in charge of programming the unlocking time of this device may program the time lock at a time which is not that intended and can thus enable any other person to open the lock of the security door whose locking bar is no longer blocked and whose opening may be affected by the first lock.

In contrast, an erroneous programming of the operation of the system can cause, if the duration of the programmed locking is erroneously prolonged, access to the protected chamber to only be permitted at a later point in time, thus blocking access by authorised persons.

In such a case, specialised teams must intervene to negate of the effect of blocking of the device, which is generally done by its partial or complete destruction.

It will be understood that such destruction causes substantial financial losses, firstly, from that the intervention of specialised teams and the putting into place of special tools and, secondly, from the destruction of the entire device or even part of the door.

Thus, it will be appreciated that classical operating systems equipping locking/unlocking devices of security chambers present a double problem which, firstly, is the possibility of an intentional organisation of a premature unlocking of the door, possible associated with a new programming to mask the infraction, and, secondly, is a non-negligible potential risk of errors of programming able to lead to grave damage, materially as well as financially.

In the two cases, it is difficult or even impossible to establish the responsibility of the persons, which may or may not belong to the security personnel, which have falsified the programming or which have effected an erroneous programming, either voluntarily or involuntarily. In such a situation, investigation procedures generally result in uncertain results, often subject to controversy.

SUMMARY OF THE INVENTION

An aim of the present invention is to respond to the above described inconveniences by supplying a programmable operating system capable of supplying proof of the origin of frauduleous or erroneous manipulations.

Another aim of the present invention is to supply a system of simple conception, offering the user a great convenience of use and a simplicity of introduction of data linked to the programming of the delay duration.

To this effect, an object of the invention is a programmable operating system for the timed locking/unlocking of a security installation, this system including:

at least one activation module intended to cause the unlocking of an opening element of the installation, and control means for this module for programming a time value corresponding to the precise moment where the operating module will be caused to unlock said element, characterized in that the control means includes at least one detachable control element constituting a mobile, detached or detachable part from said activation module which constitutes a fixed part of the installation, these two parts including communication interfaces for the transmission of information, one of the two parts, fixed or mobile, including at least its own exclusive and unique identification code, this identification code being able to be transmitted to the other part and memorised therein by memorisation means able to systematically supply a tracability of the programming in association with said identification code.

According to another characteristic of the invention, the two parts, respectively mobile and fixed, that is to say the control element and the operating module, each include their own exclusive and unique identification code.

It will also be noted that the two mobile and fixed parts each include memorisation means constituted by a non volatile memory, able to record the identification code of the other part in association with the programmed time value for the unlocking.

In addition, the control element and the operating module include a read only memory containing the identification code.

According to another characteristic of the invention, said communication devices are of the bidirection type.

It will also be noted that the control element includes a data transmission device able to transmit information contained in its memorisation means containing the programmed information to an external peripheral notably for the storing of this information.

Furthermore, the control element includes a real time clock, co-operating with a central processing unit to supply said time value defining the instant of unlocking to the activation module.

According to a variant of the invention, the clock is radio controlled.

It will further be noted that the system according to the invention includes a display of programmed information incorporated in the control element.

In addition, the control element includes means for memorising an input code authorising access to the functions of the control element.

Other characteristics and advantages of the invention will appear from the reading of the detailed description which follows, made with reference to the annexed drawings which are provided solely as an example:

DESCRIPTION OF PREFERRED EMBODIMENT

Figure 1:
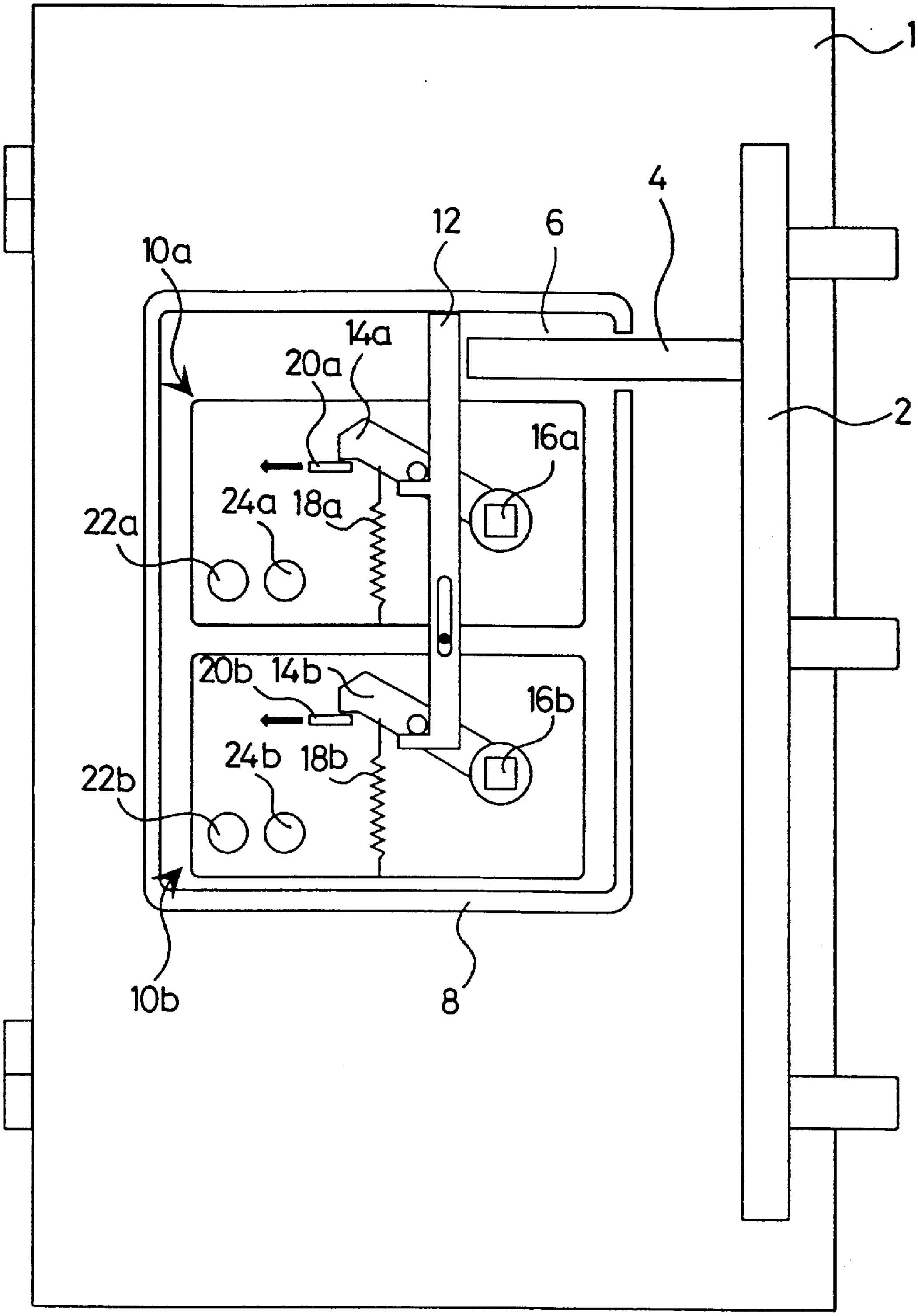
FIG. 1 is a front view of a door of a security installation including a closing system of connecting rods and a fixed part of an operating system according to the invention, associated with a locking/unlocking device represented here in an armed position.

There is represented in FIG. 1 a traditional door 1 of a security installation, such as a safe.

The door 1 is provided in a classical manner with a system of connecting rods 2 which is intended to engage in corresponding orifices, not represented, provided in a high security wall of the installation.

The system of connecting rods 2 includes a locking bar 4 which can axially slide in an appropriate passage 6, provided in a casing 8.

At the interior of the casing 8 are housed two electromechanical activation or triggering modules referenced respectively 10*a* and 10*b* which belong to the system according to the invention and which co-operate with a bolt 12 whose displacement to a high position, as represented in FIG. 1, enables the blocking of the axial displacement of the locking bar 4 of the system of connecting rods 2, whilst the displacement into a low position (not represented) enables the passage 6 of the casing 8 to be left free, in order to enable the corresponding axial displacement of the locking bar 4.

To this effect, the activation modules 10*a* and 10*b* include respectively arms or levers 14*a* and 14*b* which are rotatably mobile and which are able to control the displacement of the bolt 12 in its low position of unlocking.

It will be understood that the representation of the mechanical elements of this locking/unlocking device is very schematic, this not being the object of the present invention.

The activation modules 10*a* and 10*b* further include rotational shafts 16*a* and 16*b* which may be rotationally controlled with the aid of an appropriate key, not represented here. These shafts 16*a* and 16*b,* which are mechanically and movably fixed respectively to the arms 14*a* and 14*b* may rotationally drive the said arms to manually arm the two activation modules 10*a* and 10*b.*

This arming, when it is effectuated for all the activating modules 10*a* and 10*b,* enables to bring the bolt 12 into its high position of locking.

It will be noted that the bolt 12 may be associated in a classical manner with resilient return means, not represented here, ensuring its displacement in its represented high position (locked).

The arms or levers 14*a* and 14*b* of the activation modules 10*a* and 10*b* are respectively associated with traction springs 18*a* and 18*b* which enable them to be placed under mechanical tension and thus to arm the arms 14*a* and 14*b* in the high position.

The arms 14*a* and 14*b,* armed thanks to the shafts 16*a* and 16*b* in their high locking position, are retained in this position, thanks to the placement of mobile wedges 20*a* and 20*b,* under the non-referenced nose of the arms 14*a* and 14*b.*

Each mobile wedge 20*a* and 20*b* is controlled, via a reducing mechanism (not represented), by a classical electromechanical transducer (referenced 104 in FIG. 5), which will be described hereafter in association with the electronic circuit of the activation modules 10*a* and 10*b.*

Each mobile wedge 20*a* and 20*b* may be laterally displaced (towards the left of FIG. 1) to free the nose of the arms or levers 14*a* and 14*b,* under the control of the classical reducing mechanism which includes for example a stepping motor associated with a demultiplication mechanism, once again of classical design.

It will thus be understood that following the lateral displacement (towards the left of FIG. 1) of one of the two mobile wedges 20*a* and 20*b*, one of two arms or levers 14*a* and 14*b* instantaneously pivots and consequently abruptly displaces the bolt 12 towards the bottom into its unlocking position, this bolt being solicited in this direction by the traction springs 18*a* and 18*b*. In this position, the locking bar 4 may be axially displaced in the passage 6 to authorised a subsequent opening of the door 1, by a classic lock operated by a key, a code or a card, not represented.

Even though there has been described in this example a locking/unlocking device including two activation modules, it will be understood that the invention also applies to a device only including one module, or including a number of modules greater than two.

Security installations are generally equipped with at least two modules working in tandem in order to improve the viability of the system, the operation of at least one of these two modules ensuring the unlocking of the device.

Figure 2:
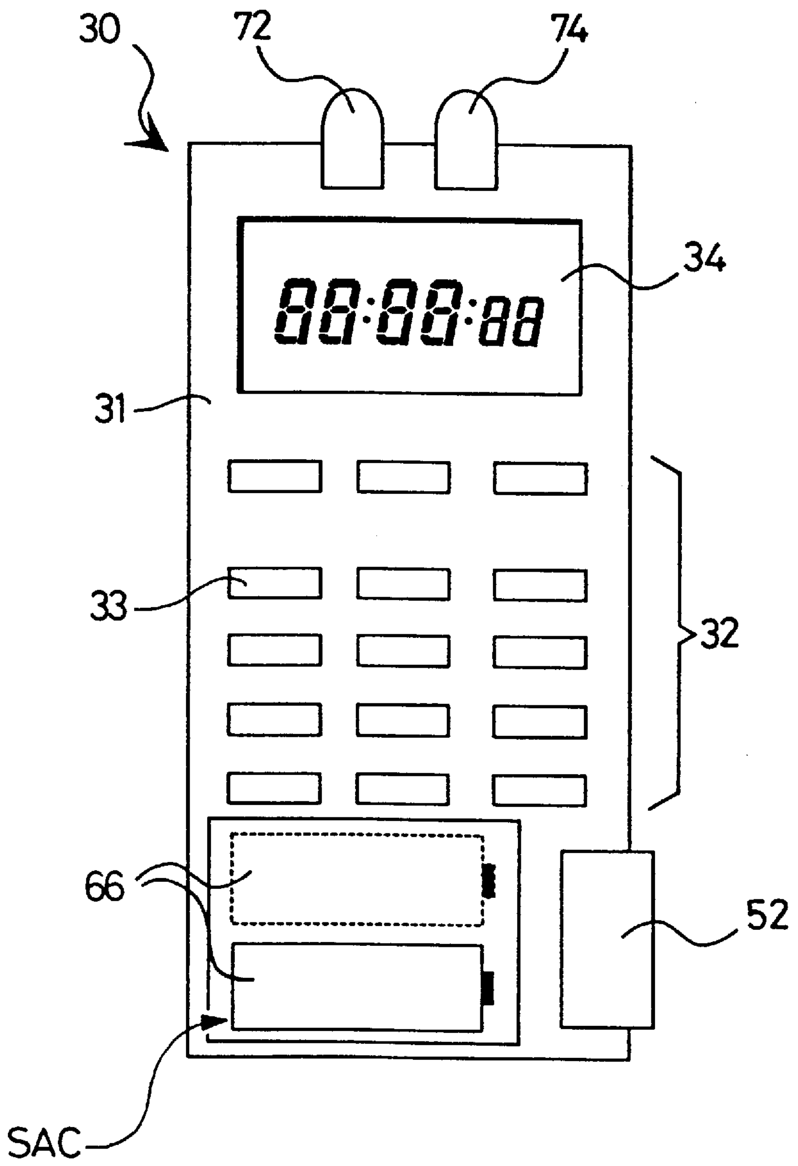
FIG. 2 is a plan view of a detachable mobile control element, belonging to the system of FIG. 1.
Figure 3:
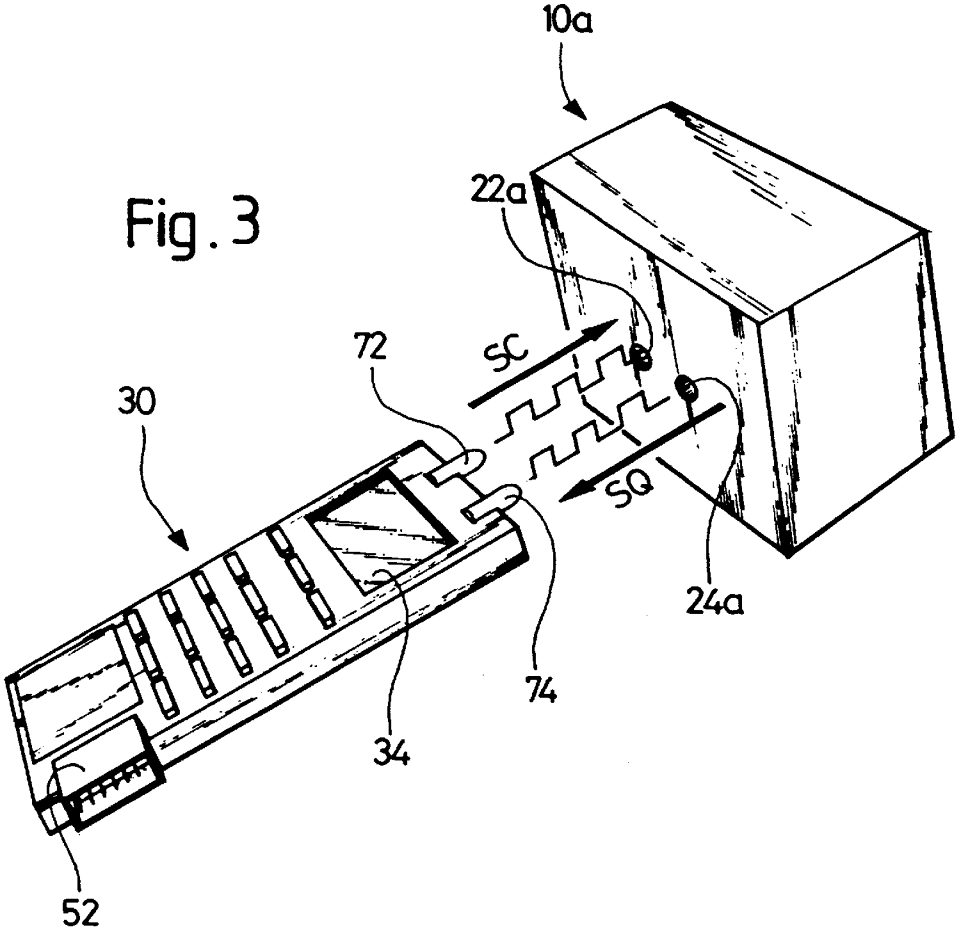
FIG. 3 is a perspective view representing the control element of FIG. 2 communicating with an activation module of the system of FIG. 1.

In a very advantageous manner and in conformance with one of these characteristics of the invention, each activation module 10*a* and 10*b* includes means for communication at a distance which enable the transfer (reception and transmission) of identification data and of reception confirmation data between these modules and a portable control element 30, represented in FIGS. 2 and 3.

These means of communicating at a distance are constituted by infrared transducers referenced 22*a* and 24*a*, for those equipping the first activation module 10*a*, and referenced 22*b* and 24*b*, for those equipping the second activation module 10*b*.

The two transducers 22*a* and 22*b* of modules 10*a* and 10*b* constitute infrared receptors of control signals SC supplied by the control element 30, whilst the two transducers 24*a* and 24*b* of modules 10*a* and 10*b* constitute infrared emitters of a reception confirmation signal SQ, signals supplied by the control element 30 to acknowledge receipt of the programming operations.

Figure 4:
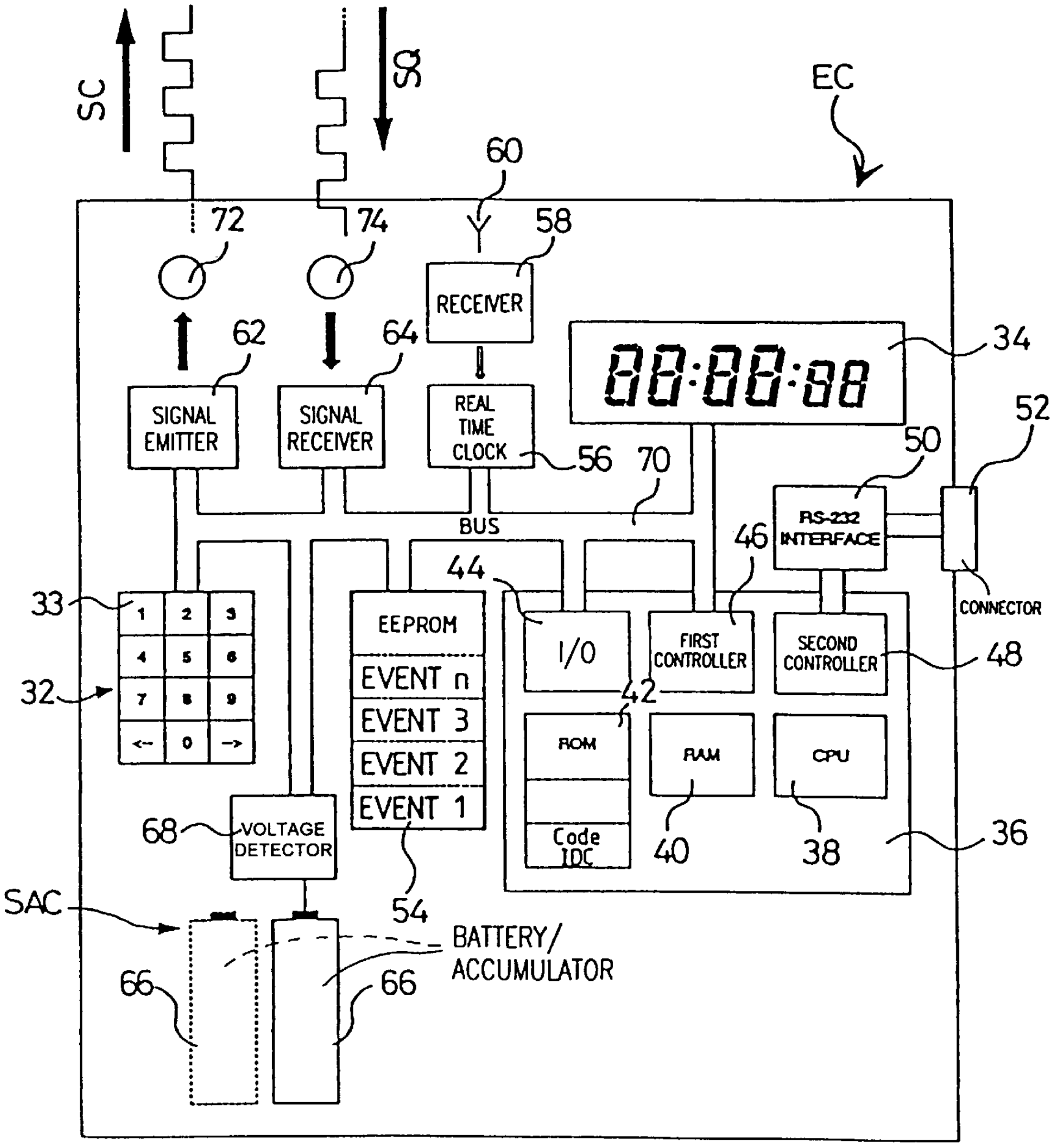
FIG. 4 is a schematic block diagram representing the electronic structure of the control element of FIGS. 2 and 3.

Referring now to FIGS. 2 and 4 there will be described hereafter the functional components constituting the electronic circuit of the control element 30 represented in FIGS. 2 and 3.

The control element 30 includes a casing 31 housing a keypad 32 whose keys 33 (only one being represented here) bear alphanumeric indications enabling, firstly, the introduction of data as such as the hour of unlocking (hour, minute, second) and/or the date of unlocking (day, month).

The keys 33 of keypad 32 may include other indications (not represented here) such as a function selection key (introduction of data function, input of access code function, editing function of diary events, language of diary). The keys 33 may also include a validation key of the program or the programs and the data introduced.

The control element 30 further includes a liquid crystal display 34 which enables the display of different groups of information, such as notably a time value, for example a number of seconds, the time and/or the date for which the unlocking has been programmed, as well as possible indication in the form of symbols representing the different functions whose values are displayed by the device.

The heart of the electronic circuit EC of the control element 30 is constituted by a microprocessor 36 which is driven by a precision oscillator, not represented.

The microprocessor 36 includes a central processing unit 38 (CPU), a random access memory 40, a read only memory 42, an input-output interface circuit 44, a first controller 46 driving the display 34 and a second controller 48 connected to an RS-232 communication interface 50.

The communication interface 50 is itself connected to a connector 52 which is intended to enable the connection between the portable control element 30 and an external apparatus, such as a printer or a computer capable of collecting and of managing the data memorised in this element. It will be understood that the connector 52 constitutes second transmission means of the control element 30 with an external device intended to store, and eventually to control and to verify the data, that will be described hereafter, memorised in the control element 30.

The RAM memory 40 may contain one or several input codes authorising access to the program of the central processing unit 38, and thus authorising access to the functions of the control unit 30. The ROM memory 42 contains an identification code IDC exclusively associated with each control element 30.

The identification code IDC of the control element 30 is unique to this control element, this code having been programmed in-factory.

Thus, it will be understood that in this security installation, in which several operators may intervene for the programming of one or several activation modules 10*a*, 10*b*, etc, each remote control element 30 includes its own identification code IDC which is unique and which is separately stored, in order to identify in a non-equivocal manner each control element 30 of the installation.

The control element 30 further includes an electrically erasable programmable read only memory (EEPROM) referenced 54 which constitutes memorising means in which may be memorised a series of events 1 to n whose structure will be described hereafter.

Each control element 30 further includes a real time clock 56 which contains the time and the date in real time, this clock being able to be in a particular embodiment, driven by a receiver of hertzien beams 58, this beam being able to be captured by an antenna 60 connected to the receiver.

Figure 6A:
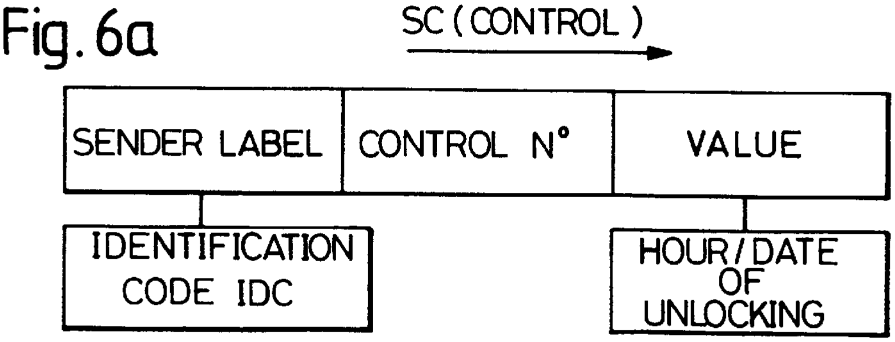

Thus, during the operation of programming one or more activation modules 10*a* or 10*b*, the time and/or the date introduced by the operator, by the keypad 32, is converted by the microcontroller 36 into a number of seconds to be counted, this number, which is permanently controlled to be processed each second at the heart of the control element 30, in the microcontroller 36, and more particularly by the central processing unit 40 in association with the RAM memory 40, then being transmitted to the activation module or modules 10*a*, 10*b*, via a control signal SC in a packet of information which will be described hereafter, represented in FIG. 6*a*.

It will thus be understood that the operation of decrementing the number of seconds constituting the time value which has been transmitted to the activation modules is done at the heart of the control element 30, and not in the activation module or modules, until the moment where this time value is going to be transmitted via the control signal SC to the activation modules 10*a*, 10*b*.

From that moment, as long as this time value is not transmitted by a validation operation on the keypad 32 of the control element 30 to all the modules of installation which must be unlocked at the same moment, this value is updated, that is to say decremented by the microcontroller 36.

After transmission of the control signal SC, this value is generated and decremented by a microcontroller 80 of the activation module which has been programmed.

When this value is also at zero, the microcontroller 80 drives a power source 102 (FIG. 5) which controls the operation of an electromechanical transducer 104. This operation of the transducer 104 causes the displacement of the wedges 20*a* and 20*b,* and liberates the bolt 12, which unlocks the bar 4.

Thanks to this arrangement, this system according to the invention can be programmed such that all the activation modules of the same door unlock the corresponding bolt in a very precise manner for an exactly simultaneous freeing action of the bolt.

Thanks to this simultaneous action of all the activation modules 10*a,* 10*b* of the door 1 on the bolt 12, the opening of the bolt 12 is guaranteed by increasing the level of force applied, from the simultaneous action of all the arms 14*a,* 14*b* in service in the system, to overcome the resistive effort opposed by the bolt 12.

It will thus be understood that the system according to the invention includes means for calculating the time value to be transmitted to the activation modules 14*a* and 14*b,* these calculating means being integrated in the control element or elements 30.

In addition, the electronic circuit EC of this control element 30 includes a signal emitter 62 and a signal receiver circuit 64, these latter being in the represented embodiment, respectively infrared signal emitter and receiver circuits.

Whilst the described embodiment concerns the transfer of data at a distance by an infrared path with first appropriate transmission means, the invention is not limited to this type of transfer which may be of an electric type (cabled connection), magnetic, inductive, optical, or by ultrasound (connection at a distance).

It will also be noted that the group of electronic components which has just been described is driven by a voltage source SAC constituted for example by a battery or accumulator 66 whose voltage level is controlled by a voltage detector 68, this battery or accumulator being able to be split into to improve the viability of the system, notably during the replacement of a battery or accumulator.

All these elements are connected together by an internal communication bus 70.

The voltage level detector 68 is intended to supply an end of life signal of the battery to the controller 36, by the communication bus 70.

The control element 30 further includes means 72 and 74 for communication at a distance intended to communicate respectively with the corresponding communication means 22*a,* 22*b* and 24*a,* 24*b* of the activation modules 10*a* and 10*b*.

As in the case of the activation modules which have been described above, these communication means are constituted, in this example, by infrared transducers, notably an electroluminescent diode and a photodiode which transform optical signals into electrical signals and vice-versa, electrical signals which are formed, modulated and filtered by two circuits respectively an emitter circuit 62 and a receiver circuit 64, and which are transmitted to the microcontroller 36 or come therefrom by the internal communication bus 70 and by the input-output circuit 44.

Figure 5:
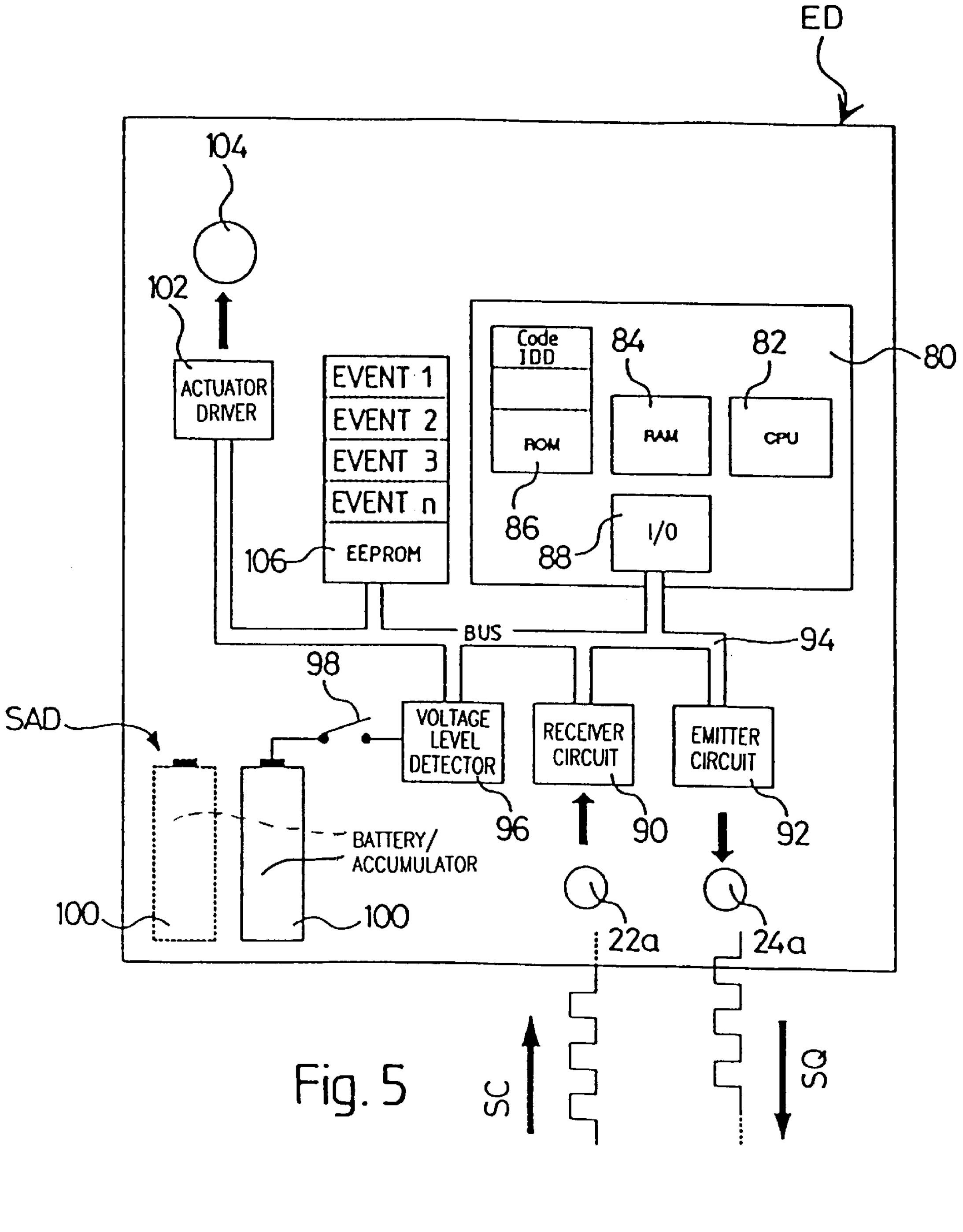
FIG. 5 is also a schematic block diagram showing the electronic circuit of one of the activation modules of the system according to the invention, represented in FIGS. 1 and 3, and FIGS. 6*a* and 6*b* are schematic representation of information packets exchanged between the mobile control element or elements and the operating module or modules of the system according to the invention.

Referring at FIG. 5, there will be described hereafter the electronic circuit ED in one of the activation modules of the installation according to the invention, for example the activation module 10*a*.

The electronic circuit ED of each activation module includes a controller 80 which comprises a central processing unit 82 (CPU), a RAM memory 84, a ROM memory 86 and an input-output circuit 88.

The ROM memory 86 contains an identification code IDD, which, once again, is unique to this activation module 10*a*.

An identification code IDD is affected in an exclusive and unique manner to each activation module of the installation, which is equipped by the electronic circuit ED, this identification code IDD having been factory programmed and being able to be stored in archived documents conserved separately. Thus, in a security installation including a large number of activation modules placed on several doors of the site, it is possible, as will be understood hereafter, to identify without ambiguity and in a non equivocal manner which activation modules have had programming operations performed thereon, and in which order, thanks to a tracibility of the programmation commands, named here “events”.

Each activation module further includes a receiver circuit 90 and an emitter circuit 92.

The receiver circuit 90 is coupled to the photodiode 22*a* which is intended to receive the control signals SC from the control element 30.

Thus, the receiver circuit 90 is adapted to transform the optical signals into electrical signals to form them and filter them, in order to then transmit them to the controller 80 by means of an internal communication bus 94 and an input-output circuit 88.

As the emitter circuit 92, this is adapted to be able to transform the electrical signals received from the controller 80 into optical signals, to form these signals and to modulate them in order to then transmit them to the electroluminescent diode 24*a* which is intended to communicate these received signals SQ to the corresponding photodiode 74 of the element 30.

Of course, as for the control element 30, the communication at distance may be performed in another form than by infrared, that is to say in an electrical form (cabled), magnetic form or inductive form (at a distance) as a function of the type of communication chosen for the above-mentioned communication element.

It will be understood that the system according to the invention comprises “on-board” communication interfaces which equip and are integrated respectively in the control element 30 and in each activation module 10*a* (or 10*b*), these interfaces being constituted, that at the heart of the control element 30, by the electroluminescent diode 72 and the electrodiode 74 and by two associated emitter and receiver circuits 62 and 64. For each activation module 10*a,* 10*b*, the interface of communication at a distance is constituted by the photodiode 22*a* (22*b*) and the electroluminescent diode 24*a* (24*b*) as well as by the emitter and receiver circuits 92 and 90.

The electronic circuit ED of each activation module 10*a,* 10*b* further includes a voltage level detector 96 which is connected, by means of a microswitch 98, to a power source SAD constituted in this example by a battery or an accumulator 100 being able to possibly be splited into two to improve the viability of the system. This power source SAD provides power to the electronic element described above, the microswitch being able to be closed and thus activated during the manual arming of the locking/unlocking device during the locking operation, notably by rotation of the shafts 16*a* and 16*b* of the activation modules 10*a* and 10*b*.

This microswitch 98 may be constituted in a variant of the embodiment, by a magnetic, optical, inductive or capacitive detector.

It will also be noted that the function of the voltage level detector 96 is to supply an end of life signal of the battery to the central processing unit 82 when the voltage level of the power source SAD is low to thus prevent the arming of the locking/unlocking system.

The electronic circuit ED of each activation of module 10*a,* 10*b* includes a power source 102 capable of supplying power to an electromechanical transducer 104 whose function is to cause, by means of a classic kinematic chain (not represented), the displacement of a mobile wedges 20*a* and 20*b* to liberate the arms or levers 14*a* and 14. The power source 102 is driven by a signal from the controller 80, which signal passes by the input-output circuit 88 and which is brought by the internal communication bus 94.

The electronic circuit ED of each activation module 10*a,* 10*b* advantageously includes memorisation means 106 constituted in this example by an electrically and erasable programmable read only memory containing the last programming commands represented in this memory in the form of events 1 to n.

The events which are recorded in a memory EEPROM 106, are represented in a more detailed manner in FIG. 6*a,* in a very schematic form.

Thus, it will be understood from what has just been described that when an operator programs an hour or a date of locking at which the activation or triggering module or modules 10*a,* 10*b* should liberate the locking bar 4, a control signal SC, here of infrared type, is transmitted in this example at a distance by means of the mobile and remote control element 30 at the different activation modules 10*a,* 10*b;* the control signal SC systematically includes, as is shown in FIG. 6*a,* firstly, a sender label identifying the source of the command, label which is constituted by the identification code IDC of the control element which served to effectuate this programming.

This signal further includes a command designation referred to by a number as well as the value of the programming data, value which is a number of seconds, the time and/or the height of unlocking which as just been programmed. Thus, each control signal SC is labelled in this manner and it is impossible that a control element can effectuate the programming of a number of seconds, a time or a date of unlocking without having to supply, in advance, its label identifying it as the programming source of the command, of the number of seconds, of the time and of the date of unlocking, label which is constituted by the own identification code of the control element used.

Figure 6B:
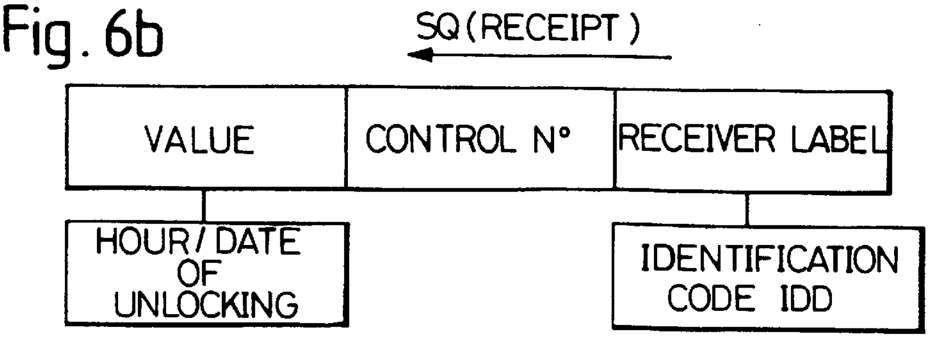

Each exchange of information is acknowledged by the programmed activation module which constitutes in this exchange the receiver of the programming. This confirmation of reception is supplied by the electronic circuit ED of the activation module to the control element 30 which is used, element which constitutes the sender and the source of the programming. This confirmation of reception is transmitted in the form of an acknowledgement of reception confirmation born by the reception confirmation signal SQ, this acknowledgement of reception including, as the information packet (FIG. 6*a*) conveyed by the control signal SC, an information packet systematically including (FIG. 6*b*) a destination label which includes the identification code IDD of the activation modules 10*a,* 10*b* which have been programmed, as well as the number of the command and the command value which is a number of seconds, the time and/or the date of unlocking which have been programmed.

Thus, it will be understood that the EEPROM memory 106 of each activation module 10*a,* 10*b* records, in the form of events 1 to n, the different information packets received from one or several control elements in accordance with the control element 30 and memorises in this manner all the programming operations effectuated by the control element or elements on the particular activation module.

In this manner, all programming operations effectuated by an operator are memorised by the receiving party (the receiver), the information contained in this memory compulsory including, in the form of an information packet, the identification code IDC of each control element which have been used for the programming.

As well, each control element 30 includes in its EEPROM memory 54, stored by events 1 to n, the information packet which it has received in the form of an acknowledgement, via the reception confirmation signal SQ, from the programmed activation module or modules. This acknowledgement of the receipt of information includes notably the identification code IDD of each activation module which has been programmed by the control element.

It will now be understood that each activation module 10*a,* 10 *b* includes an exportable and readable electronic trace of all the programmed information which it has received and enables, thanks to each sender identification code IDC recorded, to find the trace of the programmation source which has been used and thus to know which control element effectuated the fraudulent or erroneous programming operation.

Thus, even if the control element is intentionally destroyed, the origin of the error or the fraud may be refund by an appropriate reader of the information memorised in the EEPROM 106.

It will be understood that each control element 30 also includes in its EEPROM memory 54 the trace of all programming operations which have been effected therewith on each activation module, which offers a double security as to the possibility of detecting the source of programming of different activation modules in the case where these would have been deteriorated or destroyed.

There again, reading of the context of the memorisation means 54, that is to say, of the EEPROM memory of each control element 30 enables, by an exportable and readable electronic trace, to identify the operator which is at the origin of the error or of the fraudulent manipulation.

Whilst the embodiment of the invention which has been described includes to memorisation means formed by EEPROM memories 54 and 106 of the control element 30 and of the activation module 10*a* described, one could provide, in a simplified variant, only one of the parts, either fixed 10*a,* 10*b* or mobile 30, that is to say the activation modules 10*a,* 10*b* or the control element 30, with EEPROM memorisation means.

Furthermore, the memorisation means 106 of each activation module 10*a,* 10*b* may also, in a non represented embodiment, include register in which are inscribed the different identification codes IDC of the control element or elements 30 of the installation in order to be able to compare the identification code or codes IDC received with the identification code or codes IDC memorised to possibly lock the programming action taking place if a falsified control element is used.

It will also be noted here that the ROM memories 42 and 86 forming the memorisation means of the identification codes IDC and IDD of each control element 30 and of each activation module 10*a* and 10*b* may be replaced by a programmable type of memory (PROM), separated from the controller. It will be also noted that as a function of the programming of the RAM memory 40 of the control element 30, one can offer to the operator the possibility of reading the different memorised events in the EEPROM memory 54 in the form of a displayable journal by the liquid crystal display system 34 or via an impression on the connected printer to the connector 52.

It is even possible thanks to this connection to systematically effectuate a daily storing of these time-stamped journals of programming and to save this storing in a safe place. Obviously, access to these different functions may be dependant upon the introduction of an authorised access code.

It will thus be understood from what has been described that the introduction of data is solely done on the control element which is detachable and which may be protected from an unauthorised observation.

There thus exists no visual trace on the activation device of a programming value which enables the reconstitution of the programmed time value for the activation.

Furthermore, the system according to the invention may only include one control element for all the installation such that this installation may only include one keypad for the introduction of the data and one display, which enables the reduction of costs by the disposition of a limited number of costly functional elements.

We claim:

1. Programmable activation system for the timed locking/unlocking of a security installation, the activation system including:

at least one activation module for unlocking an opening element of the installation, and means for controlling the activation module to program a time value corresponding to the precise moment where the activation module will cause the unlocking of said element, characterized in that the control means include at least one remote control element constituting a mobile detachable or detached part with respect to said activation module whereas said activation module may constitute a fixed part of the installation, both parts including communicating interfaces for the transmission of information, at least one of the two parts which is referred to as the emitting part including at least one own exclusive and unique identification code being transmitted through said communicating interfaces to the other part which forms a receiving part, said code being written, for each programming operation of said time value, into memorisation means of said receiving part to constitute a label identifying in a non-equivocal manner said emitting part as source of the programming, said memorisation means which are provided to record said code within the receiving part being arranged for supplying a listing in the form of events of each programming operation, systematically in association with said identification code constituting said label.

2. System according to claim 1, characterized in that the two parts, that is to say the control element and the activation module each includes its own exclusive and unique identification code.

3. System according to claim 1, characterized in that the two parts, that is to say the control element and the activation module each includes memorising means respectively constituted by a non-volatile memory, for recording for each programming operation of said time value, the identification code of the other part in association with the programmed time value for the unlocking, the identification code of each of the parts being transmitted respectively to the other part through control and reception confirmation signals.

4. System according to claim 1, characterized in that the control element and the activation module each includes a ROM memory containing the identification code.

5. System according to claim 1, characterized in that said communication interfaces are bidirectionnal.

6. System according to claim 1, characterized in that said control element includes a device for the transmission of data able to transmit to an external peripheral device the information contained in its memorisation means containing the programmed information, notably for the storing of this information.

7. System according to claim 1, characterized in that said control element includes a real time clock co-operating with a central processing unit to supply, to the activation module, said time value defining the moment of unlocking.

8. System according to claim 7, characterized in that said clock is radio controlled.

9. System according to claim 1, characterized in that it includes a display of the programmed information incorporated with the control element.

10. System according to claim 1, characterized in that the control element includes memorisation means of an input code authorising access to the functions of the control element.

* * * * *